(12) United States Patent
Qvarth

(10) Patent No.: US 6,280,122 B1
(45) Date of Patent: Aug. 28, 2001

(54) MILLING TOOL WITH PRECISELY POSITIONABLE INSERTS

(75) Inventor: Ingemar Qvarth, Valbo (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 09/427,756

(22) Filed: Oct. 27, 1999

(30) Foreign Application Priority Data

Oct. 27, 1998 (SE) .................................................. 9803673

(51) Int. Cl.⁷ .............................. B23C 5/24; B23B 27/16
(52) U.S. Cl. .............................. 407/36; 407/49; 407/46; 407/52
(58) Field of Search .................. 407/38, 36, 44, 407/46, 52, 47, 49, 37

(56) References Cited

U.S. PATENT DOCUMENTS

| | | | |
|---|---|---|---|
| 3,217,384 | * | 11/1965 | Wirfelt ..................................... 407/36 |
| 3,378,901 | * | 4/1968 | Dupuis ..................................... 407/38 |
| 3,675,290 | * | 7/1972 | Mayer ..................................... 407/46 |
| 4,040,156 | * | 8/1977 | Tack ..................................... 407/44 |
| 5,395,186 | | 3/1995 | Qvarth . |
| 5,667,343 | * | 9/1997 | Hessman et al. ..................... 407/36 |
| 5,735,649 | * | 4/1998 | Boscarino et al. ..................... 407/44 |
| 5,800,079 | * | 9/1998 | Qvarth ..................................... 407/46 |
| 5,967,705 | * | 10/1999 | Wermeister ............................. 407/38 |

* cited by examiner

Primary Examiner—A. L. Wellington
Assistant Examiner—Erica Ergenbright
(74) Attorney, Agent, or Firm—Burns, Doane, Swecker & Mathis, L.L.P.

(57) ABSTRACT

A cutter head of a milling tool is equipped with machining elements which can be fastened in respective recesses of a rotary body by one or more clamping wedges. On the rear side of the individual machining element there are serrations which co-operate with serrations formed in a rear wall of the recess. The serrations extend generally parallel to an axis of rotation of the cutter head. A bottom wall in the recess is divided into a plurality of wall parts which are separated by a first axially facing abutment surface against which an axially facing a second abutment surface on the machining element can be engaged, to define an exact initial mounting location for the machining element.

12 Claims, 4 Drawing Sheets

Figure 1:
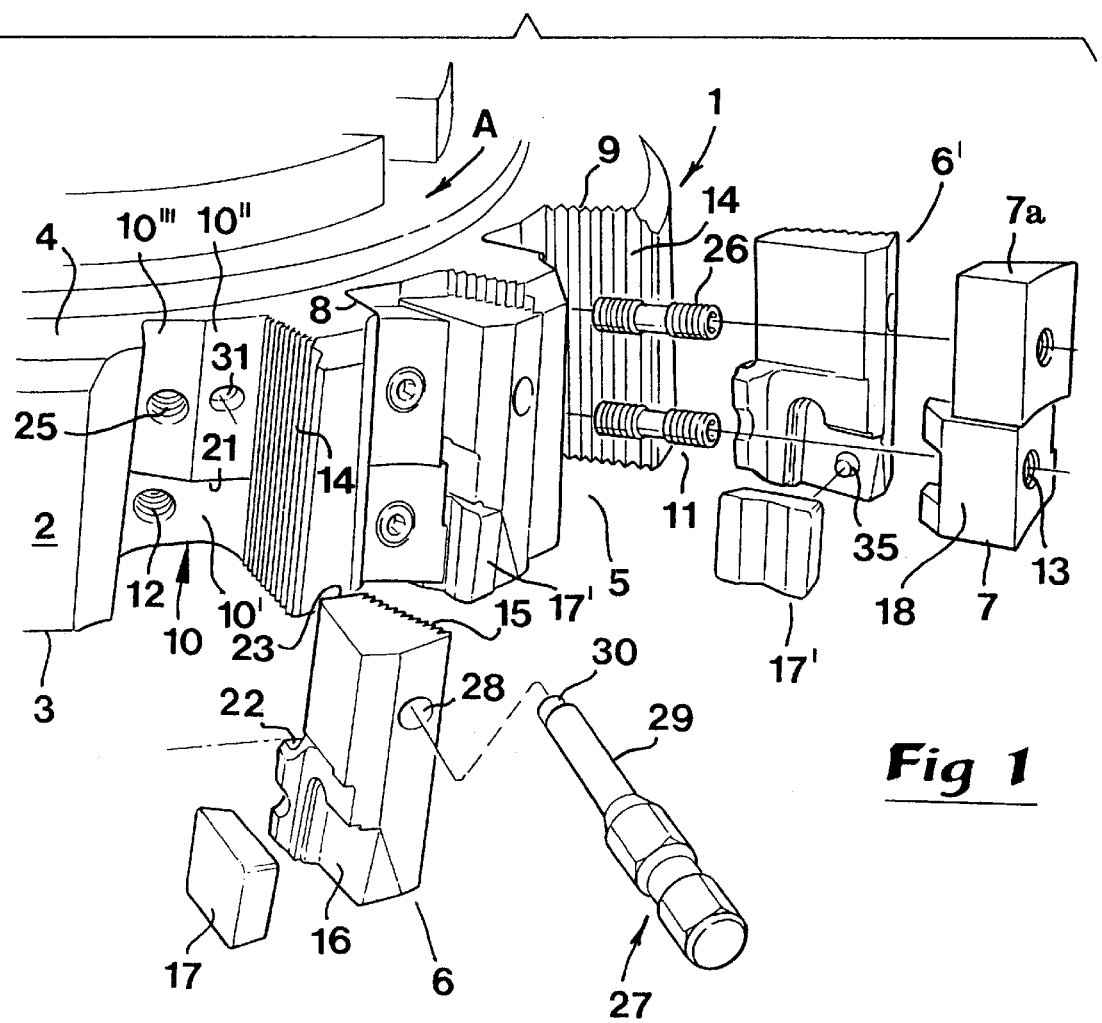

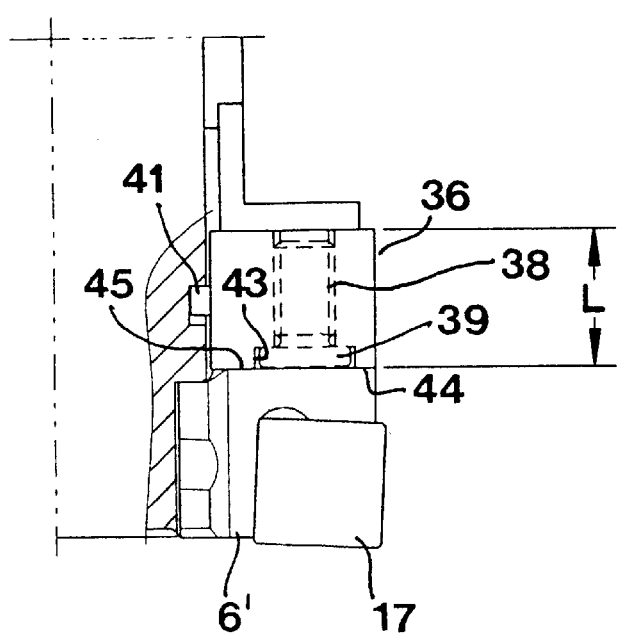
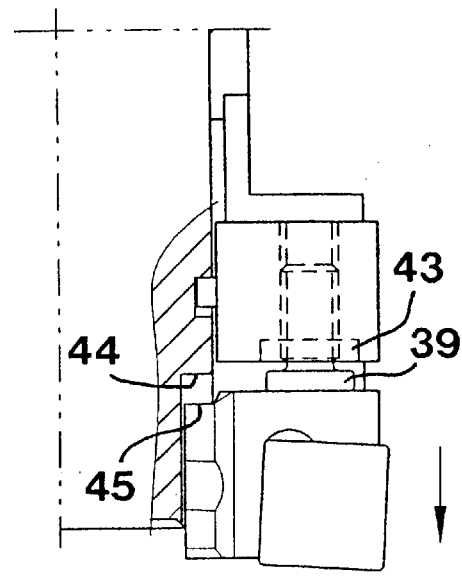
Fig 8  Fig 9

MILLING TOOL WITH PRECISELY POSITIONABLE INSERTS

RELATED INVENTION

This invention is related to an invention disclosed in concurrently filed application Ser. No. 09/427,757, the disclosure of which is incorporated herein by reference.

BACKGROUND OF THE INVENTION

This invention relates to a metal-cutting milling tool.

Such tools are known that comprise a body rotatable around a central geometric axis, which body has a peripheral envelope surface extending between opposite end surfaces. In the envelope surface, recesses are provided which open outwards, each recess defined by a front wall, a rear wall and a bottom wall and has the purpose of receiving a machining element (e.g., a cassette which carries a cutting insert) as well as at least one clamping wedge arranged in the recess for fixing the machining element in place. The clamping wedge can be tightened by means of a clamping screw which enters a threaded hole formed in the bottom wall of the recess. The rear wall of the recess has first serrations arranged to co-operate with second serrations disposed on a rear side of the machining element, while the front wall is smooth in order to cooperate with a similar smooth front surface on the clamping wedge. A contact surface on the clamping wedge and a front contact surface on the machining element are both smooth in order to allow a substantially radial displacement of the clamping wedge in relation to the machining element during the clamping thereof.

PRIOR ART

A milling tool of the above generally mentioned kind is disclosed in SE 9103724-2 (corresponding to U.S. Pat. No. 5,395,186). In this case, the individual machining element, which is in the form of a cassette having a detachable cutting insert, is insertable in the appurtenant recess from either side of the body or cutter head in a direction generally parallel to the axis of rotation. The desired position of the cassette is achieved by a manual fine adjustment thereof before the clamping wedge is finally tightened. The possibility of applying a locator pin on the interior of the cassette intended to engage into a countersink in the bottom wall of the recess is discussed in the patent. However, this countersink has a larger diameter than the locator pin, so when the cassette is initially installed in the recess, the cassette does not attain a predetermined, exactly defined axial initial position.

The job of finely adjusting the cassette manually during the assembly of the tool is difficult and time-consuming. Another inconvenience of the design of the known tool is that it has only a limited ability to resist minor breakdowns of the type that easily may arise when the cassettes, together with the cutting inserts, are submitted to instantaneous impacts or shock loads. Therefore, even if total breakdowns can be avoided, frequently so much damage occurs to the cassettes that the cassettes have to be discarded and replaced.

Furthermore, each individual cutting insert is attached to the appurtenant cassette by means of a screw which incorporates a screw head, said screw extending through a through hole in the cutting insert and being fastened in a threaded hole in the cassette. Thus, the design not only includes a clamping wedge for fixing the cassette, but also a special clamping screw for fixing the cutting insert in the cassette. That means that, in practice, the tolerance chain between, on the one hand, the tool body together with the rotation axis thereof and, on the other hand, each one of the several cutting inserts, becomes extensive. This entails, among other things, that the precision in the adjustment of the cutting insert in relation to the tool body (which in practice should be less than $\frac{1}{100}$ mm) may easily be lost or become unsatisfactory, e.g. when the cutting inserts are replaced or indexed or when the cassette, for one reason or another, has to be dismounted and remounted.

OBJECTS AND FEATURES OF THE INVENTION

The present invention aims at obviating above-mentioned inconveniences of the previously known milling tool and at providing an improved milling tool. Therefore, a primary object of the invention is to provide a milling tool in which the machining elements, preferably in the form of cassettes having detachable cutting inserts, can be located in a simple way in an exactly defined operating position in relation to the tool body during the assembly of the tool. In other words, it should be possible to mount the machining elements rapidly without having to finely adjust them manually. Another object is to provide a milling tool with a good ability to resist at least minor incidents, which could cause breakdowns in connection with impacts or shock loads of an instantaneous character, which may occur. In particular, the machining element or should be able to resist such loads without being seriously damaged or displaced from its basic position. Another object of the invention is to provide a milling tool that is suitable for operation at very high rotational speeds, e.g. all the way up to the range of 20,000–30,000 revolutions/minute.

According to the invention, at least the primary object is attained by providing the tool body and each machining element with respective abutment surfaces which face generally axially and which abut one another when the machining element is installed, in order to define a precise initial axial positioning of the machining element.

BRIEF DESCRIPTION OF THE APPENDED DRAWINGS

Figures 2, 3:
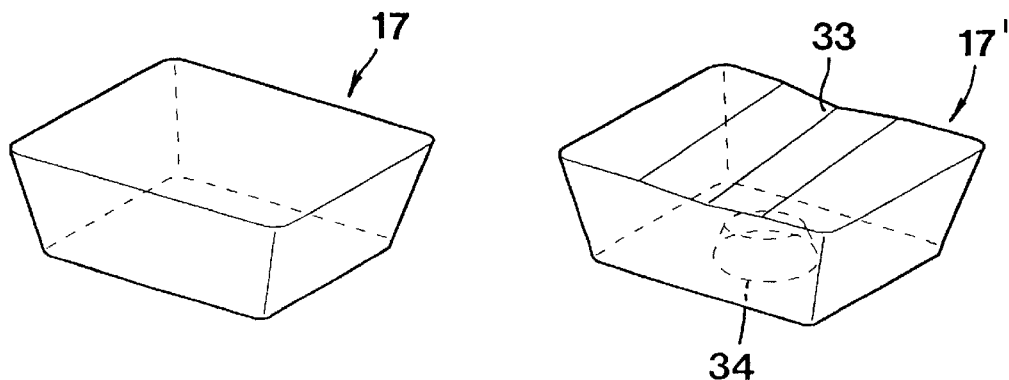
Figure 4:
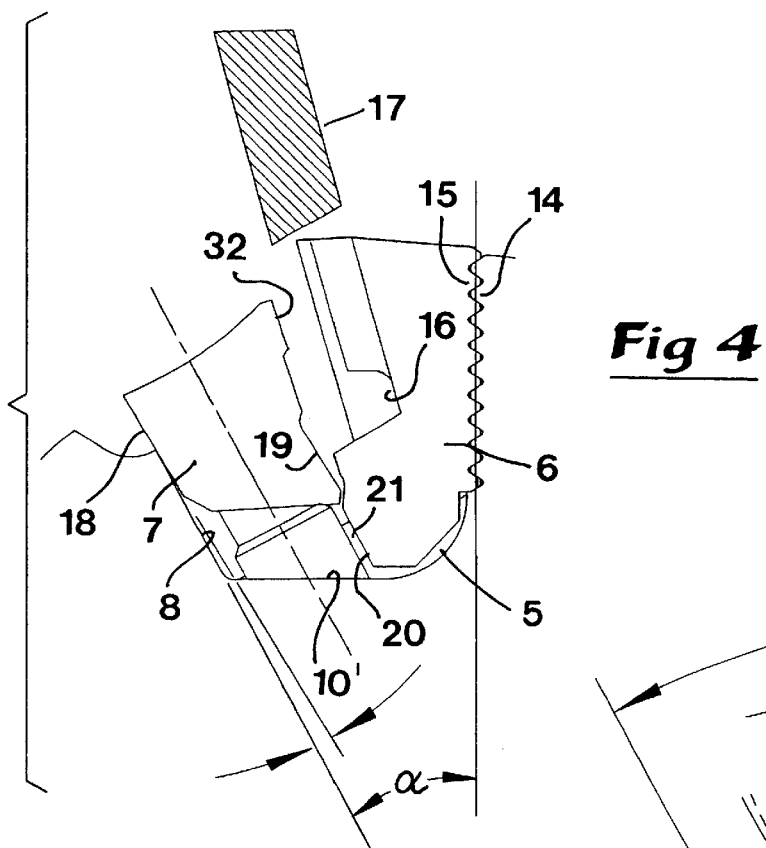
Figure 5:
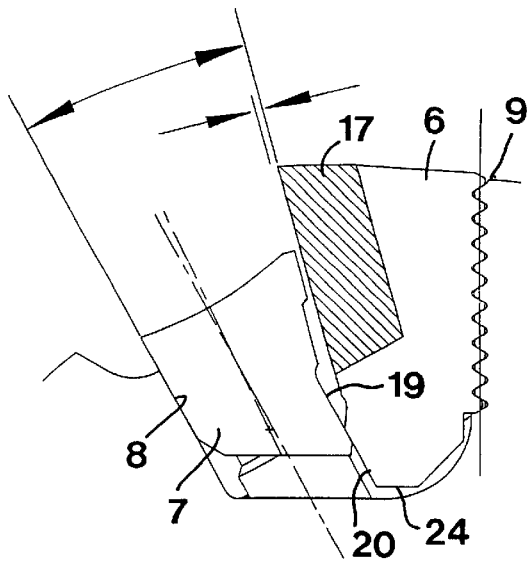
Figure 6:
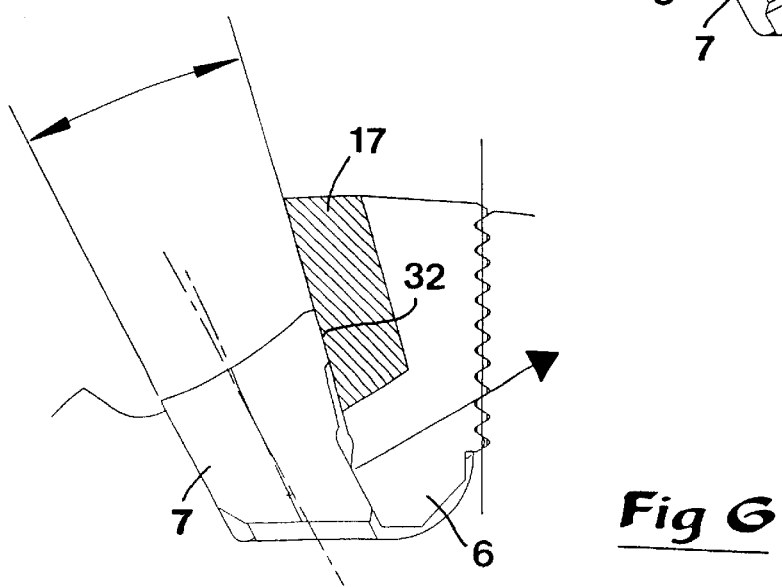
Figure 7:
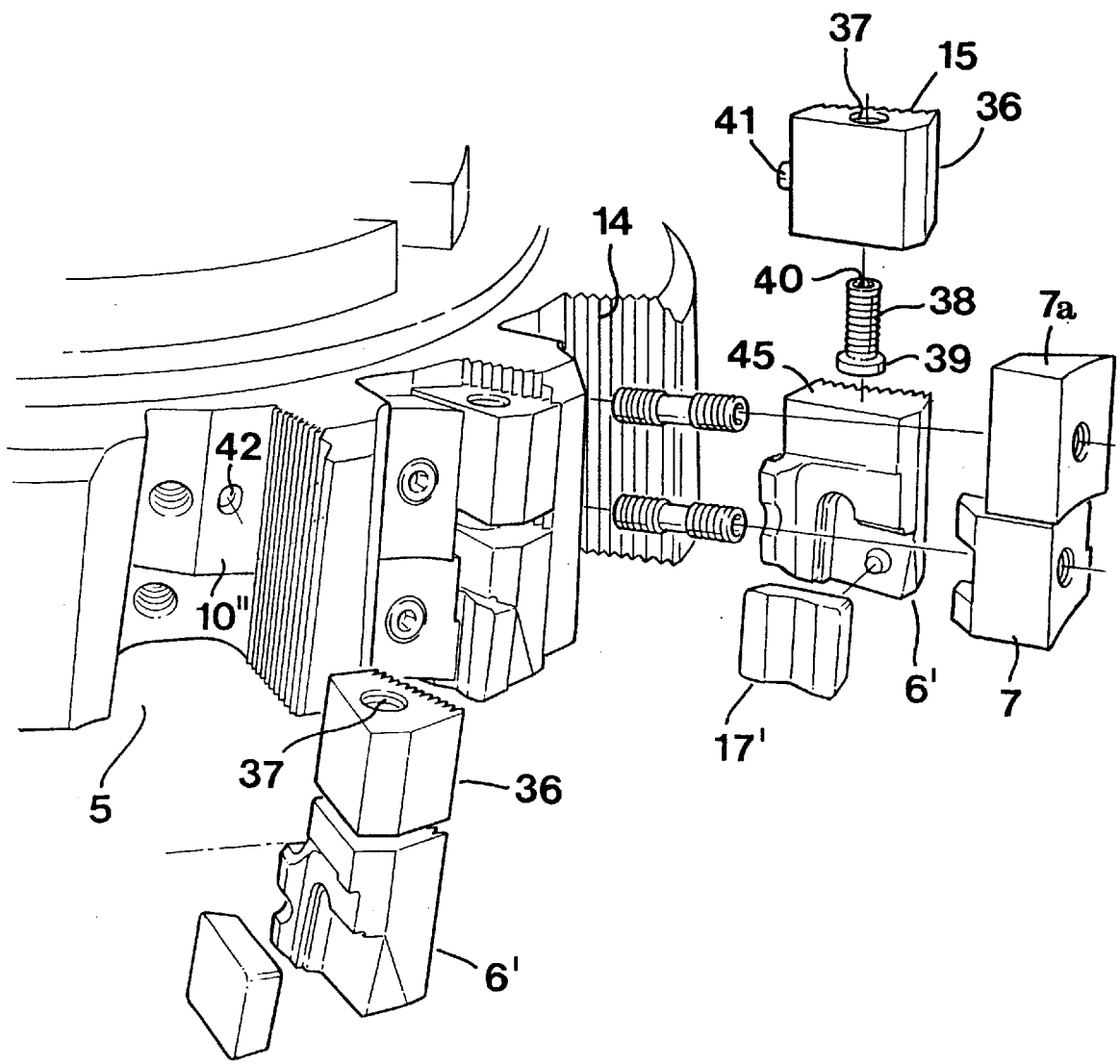

In the drawings:

FIG. 1 is a perspective exploded view showing a part of a milling tool according to the invention, as well as a number of cassettes and cutting inserts belonging to the tool, FIG. 2 is a perspective view of an individual cutting insert included in the tool, FIG. 3 is a perspective view showing an alternative embodiment of the cutting insert, FIG. 4 is a partial, schematic side view showing a cassette, a cutting insert and a clamping wedge in a first functional state, FIG. 5 is a side view corresponding to FIG. 4 showing said components in a second functional state, FIG. 6 is a third side view showing a third functional state, FIG. 7 is a perspective exploded view corresponding to FIG. 1 showing an alternative embodiment of the invention, FIG. 8 is an enlarged detailed view illustrating a means for fine adjustment of cassettes, more precisely shown in a first position, and FIG. 9 is a detailed view corresponding to FIG. 8 showing the adjustment means in a second functional state.

DETAILED DESCRIPTION OF PREFERRED EMBODIMENTS OF THE INVENTION

In FIG. 1, there is shown a body 1 in the form of a cutter head which is rotatable around a central geometric longitudinal axis (not shown). In the example, the body 1 is delimited by a peripheral, envelope-like surface 2, which extends between opposite axially spaced end surfaces 3, 4. The first-mentioned side 3 consists of a front side in the vicinity of which a tool cutting insert 17 is located, while the last-mentioned side 4 consists of a rear side to which a rotatable spindle or the like (not shown) is connected in a suitable way.

Recesses 5, which open radially outwards, extend longitudinally through the envelope surface 2, the purpose of these recesses being to accommodate machining elements, preferably in the form of cassettes 6 which carry replaceable cutting inserts, as well as at least one clamping wedge 7. Each separate recess 5 (see also FIGS. 4–6) is delimited by a radially extending front wall 8, a radially extending rear wall 9 and a bottom wall 10 interconnecting radially inner ends of the walls 8 and 9. The clamping wedge 7 is able to be clamped by means of a screw 11 that is in engagement with a threaded hole 12 formed in the bottom wall 10 of the recess 5. More precisely, the screw 11 is of the type which includes a right-hand male thread as well as a left-hand male thread, separated from each other via a waist portion. Of these threads, one is in engagement with the hole 12 in the tool body, while the other one is in engagement with a threaded, through hole 13 in the clamping wedge 7. The two male threads on the screw 11 have a certain play in relation to the female threads of the holes 12, 13. The existence of double threads on the screw 11 makes it possible to attain, in a known way per se, a function whereby the clamping wedge 7 may be displaced in relation to the body with an increased, e.g. doubled, speed in comparison with one single simple thread in connection with rotation of the screw in either direction of rotation.

The rear wall 9 of the recess 5 has first serrations 14 arranged to cooperate with corresponding second serrations 1 5 disposed on a rear side of the cassette 6. The serrations 14, 15 extend generally parallel to the axis of rotation. In this connection, it should be pointed out that the concepts "front" and "rear" walls, respectively, are related to the direction of rotation A of the tool, whereby a "front" wall is a "leading" wall, and a "rear" wall is a "trailing" wall with reference to the direction A. Thus, as viewed in the direction of rotation of the tool, the serrations 15 are provided on the rear side of the cassette facing away from a front side of the cassette in which a seat 16 for a cutting insert 17 is provided.

The front wall 8 of the individual recess 5 is (at least partially) smooth and suitably planar in order to co-operate with a likewise smooth and planar front surface 18 on the clamping wedge 7. A rear contact surface 19 (see also FIGS. 4–6) on the clamping wedge 7 is likewise smooth and planar so as to cooperate with a front, planar and smooth contact surface 20 on the cassette 6. Thanks to the fact that said surfaces 8, 18, 19 and 20 are smooth, the clamping wedge may, without obstruction, be displaced substantially radially in relation to the tool body and the cassette so as to wedge the latter.

Although the serrations 14, 15 advantageously are of a known type, it is, however, worth pointing out that they are formed generally as ridges which are spaced-apart by intermediate grooves. As may be seen in FIG. 1 in combination with FIG. 4, each of the serrations 14, 15 comprises long narrow, straight and mutually parallel ridges which may engage the grooves in the other serrations. The ridges as well as the grooves are of a triangular cross-sectional shape, the free taps of the ridges being bevelled or blunted so that the ridges do not touch the bottom of the co-operating grooves when the serrations are brought to engagement with each other. This means that each separate ridge in one of the serrations is wedged very steadily between a pair of surrounding ridges in the other serrations. In other words, a plurality of wedge joints are obtained in the interface between the cassette and the tool body. In practice, the nose angle between the flank surfaces of the individual ridges (and the corresponding angle between the side surfaces of the individual groove) may amount to about 65°. Advantageously—though not necessarily—the serrations 14 extend the entire axial length of the recess 5, i.e. between the end surfaces 3, 4. In a similar manner, the serrations 15 may extend along the entire length of the cassette 6.

As far as the milling tool shown in the drawings has been described hitherto, the same, is in all essentials, previously known from U.S. Pat. No. 5,395,186.

As a matter of form, before the features of the tool characteristic of the present invention are described in more detail, it should be pointed out that the two different embodiments of cutting inserts, 17, 17' which are shown respectively in FIGS. 2 and 3 are illustrated in FIG. 1. More precisely, the cutting insert 17 is shown in FIG. 1 in association with a cassette 6 which in a certain aspect differs from the cassettes 6' which carry the cutting inserts 17'. In practice, only cassettes and cutting inserts of one and the same uniform type are used on the milling tool, but for reasons of space, it has been chosen to illustrate two different types of cutting inserts and cassettes in FIG. 1.

According to the invention, the bottom wall 10 of the individual recess 5 is divided into at least two wall parts 10', 10" located at different respective radial distances from the rotation axis of the tool body. That is, the wall part 10" is spaced radially from the axis by a longer distance than the wall part 10', whereby the wall parts 10', 10" are separated by a first abutment surface 21 facing longitudinally toward the cutting insert (i.e., downwardly in FIG. 1). Said abutment surface 21 extends at an angle, suitably perpendicularly, to the serrations 14 and has the purpose of co-operating with an analogous, second longitudinally facing abutment surface 22 on the cassette 6. The surface 22 faces upwardly toward the surface 21 in FIG. 1. The surface 21 also extends perpendicularly to the wall part 10'. The second abutment surface 22 extends perpendicularly to the serrations 15 of the cassette (i.e., perpendicularly to the axial extension of the ridges and the grooves), and also extends perpendicularly to a first planar surface 23 disposed on the interior of the cassette as well as to a second planar surface 24 (see FIG. 5) thereon. Said first abutment surface 21 extends along the entire width of the recess 5 in the area of the bottom thereof. In an analogous way, the second abutment surface 22 extends along the entire width of the cassette at the interior thereof.

In the embodiment example shown, the wall part 10" transforms into an angled wall part 10'''. This angled wall part 10''' extends perpendicularly to both the front wall 8 of the recess, and the rear wall 9 provided with the serration 14. The angle α between the front and rear walls 8, 9 (see FIG. 4) should in practice be within the range of 25–35°. From this it follows that the angle between the wall parts 10" and 10''' is within the range of 145–155°. It should also be mentioned that a threaded hole 25 is formed in the wall part 10''', this hole receiving a clamping screw 26 to secure a second clamping wedge 7a, which has the purpose of clamping the cassette 6, but not the cutting insert 17.

When the cassette 6 is mounted in the recess 5, the cassette may, in a rapid and simple manner, be positioned in a predetermined basic position merely by the simple measure of sliding the serrations 14, 15 along each other (i.e. by sliding the cassette 6 upwardly in FIG. 1) until the abutment surface 22 is pressed against the abutment surface 21.

Due to the fact that the abutment surface 21 on the tool body (also in the cases when this is made of aluminum) as well as the abutment surface 22 on the cassette (most often of steel) may be formed with high accuracy, the cassette may thus be mounted in a simple way in an exactly defined basic position which can be repeated with ease and is consistent for all cassettes and recesses of the tool. This apparatus and method is easier, quicker than prior art arrangements which require that all initially mounted inserts be manually adjusted.

Another substantial advantage of the invention is that the cassette in the wedged or clamped state thereof, according to FIG. 6, is held with extremely good stability, not only by the numerous and large-faced wedge joints in the serrations 14, 15, but also by the fact that the abutment surfaces 21, 22 are comparatively large and in complete surface contact with each other. Thus, the serrations 14, 15 counteract, in a effective way, any tendency to radial displacement of the cassette at the same time as the clamping wedge counteracts tendencies of the cassette to tip, and the abutment surfaces 21, 22 counteract tendencies of the cassette to turn around an imaginary, radially directed geometric axis.

The milling tool may be provided with means to enable fine adjustment of the cassette in relation to the body. In FIG. 1 such a means is exemplified in the form of a separate key 27, serving as an adjusting element, which is insertable in a cylindrical, through bore 28 in the cassette. The key includes a cylindrically shaped shaft 29, which at a free end transforms into an eccentric body 30 which may be brought to engagement with an elongated countersink 31 in the bottom wall part 10". Therefore, by turning the key, the cassette may be given fine, axial movements in relation to the tool body, while the two clamping wedges are only moderately tightened and thus accommodate such adjustment. Being able to make fine adjustments to the cassette, e.g. thin a thousandth or hundredth of a millimeter, is important in such cases when tolerance deviations are found in connection with manufacture, as well as in such cases where the cassette unexpectedly would be displaced from the basic position thereof, e.g. as a consequence of shock loadings.

In FIGS. 4–6, a preferred embodiment of the invention is illustrated in which the cutting insert 17 is detachably mounted in the seat 16 of the cassette 6. More precisely, the cutting insert may be clamped in the seat with the same clamping wedge 7 used for fixing the cassette 6. In order to enable this, the clamping wedge is provided with an outer, secondary contact surface 32, which is offset backwards in relation to the inner contact surface 19. In FIG. 4, the clamping wedge 7 is shown in an outer, inactive position in which the cassette 6 as well as the cutting insert 17 may be removed from the recess 5. In FIG. 5, the clamping wedge 7 is shown in a provisionally clamped intermediate position in which the inner contact surface 19 of the clamping wedge has boarded the contact surface 20 of the cassette. In this state, the cassette 6 is fixed in the given position thereof by the fact that the serrations 14, 15 are in mesh. However, here the cutting insert 17 is still only loosely inserted into the seat 16. In FIG. 6, the clamping wedge 7 assumes a final tightened, inner end position in which the secondary contact surface 32 has been pressed against the planar front side of the cutting insert.

The cutting insert 17' shown in FIG. 3 differs from the simpler cutting insert 17 according to FIG. 2 by having a countersink provided in the front side thereof the countersink formed by a cross-section flute 33 in the shape of a V. A male projection (not shown) would be provided on a secondary contact surface 32 of the clamping wedge for engaging the countersink. On the underside of the cutting insert, a female recess 34 is provided having the shape of a truncated cone. A male member 35 (see top right in FIG. 1), having a smaller diameter than the recess 34, may engage therein. By means of the countersink 33 and the recess 34 together with the two male members engaging therein, the cutting insert 17' is secured against centrifugal forces. In other words, it is ensured that under no circumstances will the cutting insert be exposed to the risk of being thrown out of the appurtenant seat in such cases when the milling tool is driven at a very high rotational speeds.

Reference is now made to FIG. 7, which illustrates an alternative embodiment of the invention which does not utilize the screw 27 for finely adjusting the cutting insert. Instead, a cassette 6' has an extension formed by a separate support element 36. The support element 36 has a length L that (for a given thickness of the cutter head) generally corresponds to a difference between the length of the previously described cassette 6 and the length of the shorter cassette 6'. Like the cassette 6', the support element 36 has rear serrations 15 for engagement with the serrations 14. A threaded through hole 37 for a screw 38 extends axially through the support element 36. At the end thereof facing the cassette 6', the screw 38 has a flat head 39. At the opposite end, there is a seat 40 having a polygonal cross-section shape for the receipt of a key, e.g. an Allan key. A male member 41 is provided on the interior of the support element 36 having the shape of a cylindrical stud and intended to co-operate with a female recess 42 in the wall part 10". This recess 42 has more precisely an axially elongated shape.

In FIG. 8, the adjustment screw 38 is shown in an inactive state in which the head 39 of the screw is housed in a countersink 43 in the end surface 44 of the support element that faces an opposite end surface 45 on the cassette 6'. In this state, the abutment surface 22 of the cassette is pressed against the abutment surface 21 in the bottom wall of the recess; i.e. the cassette takes the basic position thereof.

If the need arises to make a fine adjustment to the cutting insert 17 or 17' e.g. as a consequence of a breakdown or the like, the screw 38 may be used for this purpose. On activation, it ensures that the stud 41 abuts distinctly against one end of the seat 42 at the same time as the second clamping wedge 7a clamps the support element 36. With the cassette 6' only loosely fastened (by only loosely tightening the first clamping wedge 7), the cassette may be displaced axially by turning the screw 38. In FIG. 9 this is shown in an exaggerated way for the sake of clarity. In practice, however, it is for most cases a question of moving the screw axially only some hundredths or tenths of a millimeter, more precisely by turning the screw only fractions of a revolution. For this purpose, the screw 38 should have a small thread pitch. When the cassette has been adjusted into the desired, exact position, the clamping wedge 7 is finally re-tightened while fixing the cassette together with the appurtenant cutting insert.

Feasible Modifications of the Invention

The invention is not solely restricted to the embodiments described and shown in the drawings. Thus, the invention may also apply to such machining elements which include cutting inserts 17 or similar cutting insert members, e.g. diamond chips, which are integrated with a cassette-like carrier. In other words, the cutting insert member is, in such cases, permanently united to the carrier, e.g. by being soldered thereto. What is essential however is that the machining element includes a cutting edge.

What is claimed is:

1. A milling tool comprising:
   a body defining a longitudinal axis of rotation and including:
      axially spaced end surfaces interconnected by a peripheral envelope surface, and
      a plurality of radially outwardly opening recesses formed in the envelope surface, each recess defined by a generally radially extending front wall, a generally radially extending rear wall, and a bottom wall interconnecting radially inner ends of the front and rear walls,
      the rear wall of each recess including first serrations extending substantially parallel to the axis,
      each bottom wall divided into first and second wall parts located at different respective distances from the axis to form a generally axially facing first abutment surface;
   a plurality of machining elements mounted in respective ones of the recesses, each machining element including:
      a front side having an insert seat, and a contact surface adjacent the insert seat,
      a rear side disposed opposite the front side and having second serrations meshed with the first serrations, and
      a generally axially facing second abutment surface facing the first abutment surface, whereby engagement between the first and second abutment surfaces defines a precise axial position of the machining element relative to the tool body;
   a plurality of clamping wedges arranged in respective ones of said recesses for retaining respective machining elements, each clamping wedge including:
      a front contact surface engaging the front wall of the respective recess, and
      a rear contact surface engaging the front contact surface of the machining element; and
   clamping screws for forcing respective clamping wedges between the front wall and the front contact surface,
   each machining element being movable relative to the body in the direction of the first and second serrations with the first and second serrations meshed together and with the respective clamping wedge moderately tightened, to enable the second abutment surface to be displaced away from the first abutment surface for effecting a fine adjustment of the insert seat relative to the body.

2. The milling tool according to claim 1 wherein each of the first and second abutment surfaces is oriented at a ninety-degree angle relative to the respective rear wall, the second abutment surface being oriented at a ninety-degree angle to the rear side of the machining element.

3. The milling tool according to claim 1 wherein each bottom wall has a width extending between the front and rear walls of the respective recess, the first abutment surface extending substantially completely along the width of the bottom wall.

4. The milling tool according to claim 1, further including a fine adjustment device for adjusting the location of each insert seat relative to the body by displacing the respective second abutment surface away from the respective first abutment surface.

5. The milling tool according to claim 4 wherein the fine adjustment device comprises a shaft extending through a bore in the respective machining element and received in a countersink formed in the one of the respective first and second wall parts situated farther from the axis, a portion of the shaft engaged in the countersink being eccentric to a center axis of the shaft, whereby rotation of the shaft about the center axis causes the machining element to move relative to the tool body in a direction parallel to the axis of rotation.

6. The milling tool according to claim 4 wherein the fine adjustment device includes a support element mounted on the respective machining element and forming an extension thereof in a direction parallel to the axis, the support element including third serrations meshing with the first serrations of the respective recess, an additional clamping wedge mounted in each recess for holding the third and first serrations in mesh with one another, and an adjusting screw threadedly mounted in one of the machining element and the support element and abutting against the other of the machining element and the support element, whereby rotation of the adjusting screw produces relative axial movement between the machining element and the support element.

7. The milling tool according to claim 1 wherein the front side of each machining element, and the front and rear contact surfaces of each wedge are smooth.

8. The milling tool according to claim 1 wherein each of the bottom walls includes a threaded hole therein, and each of the clamping screws extends through a respective clamping wedge and is threaded into a respective threaded hole.

9. A method of assembling a milling tool, the tool comprising:
   a body defining a longitudinal axis of rotation and including:
      axially spaced end surfaces interconnected by a peripheral envelope surface, and
      a plurality of radially outwardly opening recesses formed in the envelope surfaces, each recess defined by a generally radially extending front wall, a generally radially extending rear wall, and a bottom wall interconnecting radially inner ends of the front and rear walls,
      the rear wall of each recess including first serrations extending substantially parallel to the axis,
      each bottom wall divided into first and second wall parts located at different respective distances from the axis to form a generally axially facing first abutment surface;
   a plurality of machining elements mounted in respective ones of the recesses, each machining element including:
      a front side having an insert seat, and a contact surface adjacent the insert seat,
      a rear side disposed opposite the front side and having second serrations meshed with the first serrations, and
      a generally axially facing second abutment surface facing the first abutment surface, whereby engagement between the first and second abutment surfaces defines a precise axial position of the machining element relative to the tool body;
   a plurality of clamping wedges arranged in respective ones of said recesses for retaining respective machining elements, each clamping wedge including:
      a front contact surface engaging the front wall of the respective recess, and
      a rear contact surface engaging the front contact surface of the machining element; and clamping screws for forcing respective clamping wedges between the front wall and the front contact surface;

the method comprising the steps of: (a) installing each machining element into its respective recess by sliding the first serrations along the second serrations in a direction generally parallel to the axis until the first abutment surface contacts the second abutment surface, (b) effecting a moderate tightening of the respective clamping wedge, (c) moving the respective machining element relative to the body in the direction of the first and second serrations with the first and second serrations meshed together to move the second abutment surface away from the first abutment surface for effecting a fine adjustment of the insert seat relative to the body, and then (d) effecting a final tightening of the respective clamping wedge.

10. A milling tool comprising:

a body defining a longitudinal axis of rotation and including:
   axially spaced end surfaces interconnected by a peripheral envelope surface, and
   a plurality of radially outwardly opening recesses formed in the envelope surface, each recess defined by a generally radially extending front wall, a generally radially extending rear wall, and a bottom wall interconnecting radially inner ends of the front and rear walls,
   the rear wall of each recess including first serrations extending substantially parallel to the axis,
   each bottom wall divided into first and second wall parts located at different respective distances from the axis to form a generally axially facing first abutment surface;

a plurality of machining elements mounted in respective ones of the recesses, each machining element including:
   a front side having an insert seat, and a contact surface adjacent the insert seat,
   a rear side disposed opposite the front side and having second serrations meshed with the first serrations, and
   a generally axially facing second abutment surface facing the first abutment surface, whereby engagement between the first and second abutment surfaces defines a precise axial position of the machining element relative to the tool body;

a plurality of clamping wedges arranged in respective ones of said recesses for retaining respective machining elements, each clamping wedge including:
   a front contact surface engaging the front wall of the respective recess, and
   a rear contact surface engaging the front contact surface of the machining element;

clamping screws for forcing respective clamping wedges between the front wall and the front contact surface; and a fine adjustment device for adjusting the location of each insert seat relative to the tool body by displacing the respective second abutment surface away from the respective first abutment surface, the fine adjustment device comprising a shaft extending through a bore in the respective machining element and received in a countersink formed in the one of the respective first and second wall parts situated farther from the axis, a portion of the shaft engaged in the countersink being eccentric to a center axis of the shaft, whereby rotation of the shaft about the center axis causes the machining element to move relative to the tool body in a direction parallel to the axis of rotation.

11. A milling tool comprising:

a body defining a longitudinal axis of rotation and including:
   axially spaced end surfaces interconnected by a peripheral envelope surface, and
   a plurality of radially outwardly opening recesses formed in the envelope surface, each recess defined by a generally radially extending front wall, a generally radially extending rear wall, and a bottom wall interconnecting radially inner ends of the front and rear walls,
   the rear wall of each recess including first serrations extending substantially parallel to the axis,
   each bottom wall divided into first and second wall parts located at different respective distances from the axis to form a generally axially facing first abutment surface;

a plurality of machining elements mounted in respective ones of the recesses, each machining element including:
   a front side having an insert seat, and a contact surface adjacent the insert seat,
   a rear side disposed opposite the front side and having second serrations meshed with the first serrations, and
   a generally axially facing second abutment surface facing the first abutment surface, whereby engagement between the first and second abutment surfaces defines a precise axial position of the machining element relative to the tool body;

a plurality of clamping wedges arranged in respective ones of said recesses for retaining respective machining elements, each clamping wedge including:
   a front contact surface engaging the front wall of the respective recess, and
   a rear contact surface engaging the front contact surface of the machining element;

clamping screws for forcing respective clamping wedges between the front wall and the front contact surface; and a fine adjustment device for adjusting the location of each insert seat relative to the tool body by displacing the respective second abutment surface away from the respective first abutment surface, the fine adjustment device including a support element mounted on the respective machining element and forming an extension thereof in a direction parallel to the axis, the support element including third serrations meshing with the first serrations of the respective recess, an additional clamping wedge mounted in each recess for holding the third and first serrations in mesh with one another, and an adjusting screw threadedly mounted in one of the machining element and the support element and abutting against the other of the machining element and the support element, whereby rotation of the adjusting screw produces relative axial movement between the machining element and the support element.

12. The milling tool according to claim 11 wherein each support element and the tool body engage one another by a mechanical connection comprised of male and female parts for limiting an amount of axial movement of the support element in a direction away from the tool body.

* * * * *